(12) United States Patent
Ichihara et al.

(10) Patent No.: US 7,143,881 B2
(45) Date of Patent: Dec. 5, 2006

(54) PULLEY UNIT HAVING ONE-WAY CLUTCH

(75) Inventors: Takahiro Ichihara, Kashiwara (JP); Hideki Fujiwara, Kitakatsuragi-gun (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/262,079

(22) Filed: Oct. 2, 2002

(65) Prior Publication Data
US 2003/0085091 A1 May 8, 2003

(30) Foreign Application Priority Data
Oct. 2, 2001 (JP) ............................. 2001-306281
Nov. 1, 2001 (JP) ............................. 2001-336061
Nov. 21, 2001 (JP) ............................. 2001-355542

(51) Int. Cl.
*F16D 3/34* (2006.01)

(52) U.S. Cl. ..................................... 192/45; 192/104 C

(58) Field of Classification Search ................. 192/45, 192/110 B, 41 R, 104 R, 104 B, 104 C, 106 R
See application file for complete search history.

(56) References Cited

U.S. PATENT DOCUMENTS

| | | | | |
|---|---|---|---|---|
| 2,543,482 | A | | 2/1951 | Williams |
| 3,935,749 | A | * | 2/1976 | Groves ............................ 74/6 |
| 4,178,805 | A | * | 12/1979 | Mazzorana ...................... 74/6 |
| 4,494,637 | A | * | 1/1985 | Gotoda et al. ............. 192/48.4 |
| 4,629,042 | A | * | 12/1986 | Gaus et al. ................ 192/3.25 |
| 5,117,954 | A | * | 6/1992 | Iga ............................... 192/45 |
| 5,119,919 | A | * | 6/1992 | Iga ............................... 192/45 |
| 5,265,706 | A | * | 11/1993 | Iga ............................... 192/42 |
| 5,876,298 | A | | 3/1999 | Kato et al. |
| 6,095,301 | A | * | 8/2000 | Fujiwara et al. ............... 192/45 |
| 6,279,708 | B1 | * | 8/2001 | Yatabe et al. ............. 192/45.1 |
| 6,394,249 | B1 | * | 5/2002 | Tazumi et al. ................ 192/45 |
| 6,513,633 | B1 | * | 2/2003 | Aida et al. .................... 192/45 |
| 6,848,552 | B1 | * | 2/2005 | Miller ......................... 192/45 |

FOREIGN PATENT DOCUMENTS

| | | |
|---|---|---|
| EP | 0 947 721 | 10/1999 |
| EP | 1 101 978 | 5/2001 |
| FR | 2 774 446 | 8/1999 |

OTHER PUBLICATIONS

Patents Abstracts of Japan, JP 08-177888, Jul. 12, 1996.

* cited by examiner

*Primary Examiner*—Saul Rodriquez
(74) *Attorney, Agent, or Firm*—Oblon, Spivak, McClelland, Maier & Neustadt, P.C.

(57) ABSTRACT

A pulley is concentrically disposed around a hollow shaft, and a one-way clutch is disposed between the hollow shaft and the pulley. At least one bearing is provided between the shaft and the pulley. In the one-way clutch, a roller as a meshing member and a coil spring as a biasing member are integrally rotated together with an outer ring. The roller moves in a meshing-releasing direction by a centrifugal force when a rotation speed of the outer ring becomes equal to or higher than a predetermined speed, and a biasing force of the coil spring has enough magnitude for permitting this movement. The pulley is provided at its inner periphery with a cam surface, and the pulley and the outer ring of the one-way clutch are integrally formed.

21 Claims, 8 Drawing Sheets

Pressure viscosity coefficient (GPa$^{-1}$)

As the pressure viscosity coefficient is increased, the wear depth is reduced, but if the coefficient becomes 10GPa$^{-1}$ or higher, the wear depth is not varied so much.

* In the case of NU, meshing ability is excellent in a range of -30 to 100°C.

* In the case of K8, meshing slip is generated with 10000 rad/s$^2$ at 100°C, and if a temperature is reduced, angular acceleration of meshing limit is lowered. Meshing is not established at -30°C.

PULLEY UNIT HAVING ONE-WAY CLUTCH

BACKGROUND OF THE INVENTION

The present invention relates to a pulley unit having a one-way clutch used in a belt driving starter in a belt transmission system for transmitting a rotation force when an internal combustion engine is started and when auxiliary equipment is driven by the internal combustion engine.

SUMMARY OF THE INVENTION

Japanese Patent Application Laid-open No.2001-99197 discloses, as shown in FIG. 9, a pulley unit having a one-way clutch comprising a frame (51) forming a front end of an engine starter (50); a clutch output shaft (52) having a shaft portion (52a), a disk portion (52b) and an outer cylinder portion (52c) and which is rotatably supported by the frame (51) through a bearing (53) disposed between a front portion of the frame (51) and the shaft portion (52a); a clutch input shaft (54) rotatably supported by a rear projection of the shaft portion (52a) of the clutch output shaft (52) through a bearing (55); a plurality of sprags (56) which is disposed between the outer cylinder portion (52c) of the clutch output shaft (52) and the clutch input shaft (54), and which meshes between both the input shaft (54) and the output shaft (52) if both the shafts (52) and (54) are relatively rotated in one direction (lock direction), and which releases the meshing state if both the shafts (52) and (54) are relatively rotated to the other direction (free direction); and a pulley (57) fixed to a tip end of the shaft portion of the clutch output-shaft (52) by a nut (58).

According to the pulley unit having the one-way clutch, if a DC motor (59) of the engine starter (50) rotates at a high speed, this rotation is decelerated by a planetary gear speed reducer (60) and transmitted to the clutch input shaft (54), the rotation of the clutch input shaft (54) is transmitted to the clutch output shaft (52) through the sprags (56). The rotation transmitted to the clutch output shaft (52) is transmitted by the pulley (57), so that the pulley (57) rotates and drives the engine through the belt, thereby driving the engine. If the engine is started and the revolution number of the clutch output shaft (52) exceeds the number of revolution of the clutch input shaft (54), the sprags (56) separate from the clutch input shaft (54) and thereafter, the clutch output shaft (52) and the pulley (57) can rotate without receiving resistance from the clutch input shaft (54).

It is an object of this conventional invention is to use the pulley unit having the one-way clutch for a starter in a belt transmission system for an internal combustion engine which transmits starting torque to a crankshaft through a belt.

In the conventional pulley unit having the one-way clutch, the clutch output shaft (52) is rotated integrally with the pulley (57) during rotation of the pulley (57), but since a portion of the clutch output shaft (52) does not contribute to the driving of the engine, not only the shaft portion (52a), but also its disk portion (52b) and outer cylinder portion (52c) are rotated, which is a great factor of energy loss.

Thereupon, it is considered that a one-way clutch having an inner ring, an outer ring and an operation member (e.g., sprag, spring or the like) disposed between these rings is provided between the shaft and the pulley disposed concentrically around the shaft, and a portion which rotates together with the pulley is reduced. Further, it is considered that the one-way clutch is a roller type clutch instead of the sprag type clutch, comprising, e.g., an inner ring; an outer ring; a cam surface provided on an inner peripheral surface of the outer ring; rollers as a plurality of meshing members which is disposed in a wedge-shaped space formed by the cam surface and an outer peripheral surface of the inner ring, which meshes between the inner ring and the outer ring if the inner ring and the outer ring are relatively rotated in one direction and which releases the meshed state when the inner ring and the outer ring are relatively rotated in the other direction; and a coil spring as a biasing member which biases the roller in a meshing direction (in a direction of the wedge-shaped space), in which the roller is biased in the meshing direction by the coil spring, and the roller is moved in the meshing-releasing direction by centrifugal force.

If the roller type one-way clutch is to be disposed between the shaft and the pulley which is concentrically disposed around the shaft, however, since an outer diameter of the pulley is limited, an inner diameter of the outer ring of the one-way clutch becomes naturally small and with this, P.C.D. (Pitch Circle Diameter) of the roller also becomes small, centrifugal force acting on the roller becomes small, and there is a problem that the roller and the inner ring of the one-way clutch are into non-contact with each other.

It is an object of the present invention to provide a pulley unit having a one-way clutch capable of reducing energy loss.

It is another object of the present invention a pulley unit having a one-way clutch in which the one-way clutch is provided between the shaft and the pulley and a non-contact state between the meshing member and the shaft at the time of idling can easily be secured.

It is another object of the present invention to provide a producing method of an inner ring of a one-way clutch which is suitable for obtaining a pulley unit having a one-way clutch.

The present invention provides a pulley unit having a one-way clutch comprising a one-way clutch which has an inner ring, an outer ring, a meshing member disposed between both the rings, and a biasing member for biasing the meshing member in a meshing direction, and which is disposed between a shaft and a pulley concentrically disposed around the shaft, wherein at least one bearing is provided between the shaft and the pulley, in the one-way clutch, the meshing member and the biasing member are rotated integrally with the outer ring, the meshing member is moved in a meshing-releasing direction by a centrifugal force if a rotation speed of the outer ring becomes equal to or greater than a predetermined speed, and a biasing force of the biasing member has enough magnitude to allow this movement.

The one-way clutch may be of a sprag type having a sprag as the meshing member and the spring for biasing the sprag as the operation member, or may be of a roller type having a roller as the meshing member and a spring for biasing the roller as the operation member.

For example, the one-way clutch has a structure (outer ring cam type) comprising a cam surface provided on an inner peripheral surface of the pulley as the outer ring, a plurality of rollers as a plurality of meshing members which are disposed in a wedge-shaped space formed by the cam surface and an outer peripheral surface of the shaft as the inner ring, and which meshes between the shaft and the pulley when the shaft and the pulley are relatively rotated in one direction, and which releases the meshing state when the shaft and the pulley are relatively rotated in the other direction, and a coil spring as the biasing member for biasing the roller in the meshing direction (toward a narrow side of the wedge-shaped space).

According to the pulley unit having the one-way clutch, if it is used as a belt driving starter of an engine, the meshing member and the biasing member are integrally rotated with the outer ring at the time of starting but after that, if the rotation speed of the outer ring becomes equal to or higher than a predetermined speed, only the pulley is rotated, and energy loss which is caused when a portion which does not contribute to the driving of the engine is rotated can be suppressed.

In this pulley unit having the one-way clutch, it is preferable that the pulley and the outer ring of the one-way clutch are integrally formed.

With this structure, P.C.D of the meshing member of the one-way clutch (sprag, roller) can be increased while suppressing the outer diameter of the pulley and as a result, a centrifugal force acting on the meshing member becomes great, and the non-contact state between the meshing member and the shaft at the time of idling can be secured.

It is preferable that the one-way clutch is provided between the shaft and an axially intermediate portion of the pulley, a roller bearing and a ball bearing are disposed between the shaft and the pulley through the one-way clutch.

With this structure, the pulley can rotate at high speed, and this unit can be used suitably as a belt driving starter of an engine of an automobile.

It is preferable that the shaft is hollow, and the pulley has a belt-winding portion around which a belt is wound, and a diametrical distance T1 between an innermost diameter portion of an outer periphery of the pulley in the belt-winding portion and a center of the meshing member is smaller than a diametrical distance T2 between a center of the meshing member in a meshing starting position and a minimum inner diameter portion of an inner periphery of the shaft.

With this structure, P.C.D of the meshing member can be increased while suppressing the outer diameter of the pulley, and the centrifugal force acting on the meshing member can further be increased.

Further, the outer ring has a cam surface, the cam surface and an outer peripheral surface of the inner ring form a wedge-shaped space, the meshing member is a roller disposed in the wedge-shaped space, the one-way clutch further has a holder for holding the roller and the biasing member, and a roller holding portion which is formed in a wider portion in the wedge-shaped space by a roller holding surface provided on an inner periphery of the outer ring and a roller holding surface provided on an inner periphery of the holder, and which holds the roller which moved in the meshing-releasing direction in a non-contact state with the inner ring.

In this case, the spring is a coil spring for example, but the spring may be a leaf spring or the like. The center shaft of the spring is positioned such that the center shaft substantially coincides with a moving direction of the meshing member when the centrifugal force is applied. A diametrical size (in a transverse cross section) of a portion of the spring abutting against the roller is smaller than a diameter of the roller, and the roller holding portion is provided with a roller holding surface of the outer ring and a roller holding surface of the holder such that the abutting portion of the spring against the roller is sandwiched from opposite sides (such that the transverse cross section becomes substantially folding-fan shape).

With this structure, the roller and the spring held by the holder rotate integrally with the outer ring, and the roller moves in the meshing-releasing direction by a centrifugal force when the rotation speed of the outer ring becomes equal to or higher than a predetermined speed. The roller which moved in the meshing-releasing direction is held in the non-contact state with respect to the inner ring by the roller holding portion provided on a wider side in the wedge-shaped space. Since the roller holding portion is formed by the roller holding surface provided on the inner periphery of the outer ring and the roller holding surface provided on the inner periphery side of the holder, the roller is prevented from tilting by vibration or the like and thus, heat which may be caused by contact between the roller and the raceway surface of the inner ring and clogging of the roller are prevented.

The holder is provided with a spring end positioning surface for preventing the spring from moving in the axial direction, a spring inner side positioning surface for preventing the spring from moving inward which is perpendicular to a spring axis, and a spring outer side positioning surface for preventing the spring from moving outward which is perpendicular to the spring axis. In this case, the roller holding surface of the outer ring is provided between the cam surface and the spring outer side positioning surface, and the roller holding surface of the holder is continuously provided with the spring inner side positioning surface.

With this structure, the roller moves and the spring is deformed in association with each other reliably, and even if lock free is repeated, function thereof can reliably be exhibited.

It is preferable that the roller holding surface of the outer ring is It is preferable that the roller holding surface of the outer ring is a recessed surface having an arc transverse cross section. In this case, the roller holding surface of the holder also may be a recessed surface having an arc transverse cross section. The roller holding surface of the holder may be a slant surface connected to the spring inner side positioning surface.

With this structure, since the roller having a cylindrical surface is easily accommodated in the roller holding portion, the above effect is more reliably exhibited.

Further, the outer ring has a cam surface, the cam surface and an outer peripheral surface of the inner ring form a wedge-shaped space in which the meshing member is disposed, the biasing member is a spring which biases the meshing member toward a narrow portion of the wedge-shaped space, the one-way clutch further has a holder for holding the meshing member and the spring, the spring has a center shaft which is inclined in a tangent direction of the outer peripheral surface of the inner ring so that the spring can be deformed in a direction in which a biasing force of the spring biasing the meshing member is reduced when a centrifugal force is applied, and the spring has a spring end positioning surface for preventing the spring from moving in an axial direction of the spring, a spring inner side positioning surface for preventing the spring from moving inward which is perpendicular to a spring axis, and a spring outer side positioning surface for preventing the spring from moving outward which is perpendicular to the spring axis.

In this case, the spring is a coil spring for example, but the spring may be a leaf spring or the like. The center shaft of the spring is positioned such that the center shaft substantially coincides with the moving direction of the meshing member when the centrifugal force is applied. It is not always necessary that a moving direction of the center shaft and a moving direction of the meshing member when the centrifugal force is applied coincide with each other.

With this structure, the meshing member held by the holder and the spring are integrally rotated with the outer ring, and the meshing member moves in the meshing-releasing direction by a centrifugal force when the rotating speed of the outer ring becomes equal to or higher than a predetermined speed. Since the center shaft is inclined with respect to the outer peripheral surface of the inner ring, the centrifugal force acting on the spring has a component in the axial direction of the spring in addition to a component perpendicular to the center shaft of the spring. Therefore, a biasing force of the spring when the centrifugal force is applied is a sum of the original resilient force of the spring and the axial component of the centrifugal force. When the centrifugal force is applied, the spring is deformed in a direction reducing the biasing force with respect to the meshing member. Thus, the biasing force of the spring when the centrifugal force is applied becomes smaller than the original resilient force of the spring. Therefore, if the centrifugal force is applied when the rotation speed of the outer ring becomes equal to or greater than a predetermined speed, the meshing member can easily moved in the meshing-releasing direction (toward the wide side of the wedge-shaped space). If the centrifugal force is not applied, the biasing force of the of the spring becomes original resilient force of the spring and increases, and the meshing member can easily move in the meshing direction (toward the narrow side of the wedge-shaped space). The spring can not move other than in a direction deforming in the axial direction by the spring end positioning surface, the spring inner side positioning surface, and the spring outer side positioning surface, the spring is deviated when the meshing member moves, and the biasing force direction of the spring when the outer ring is stopped is not changed, and there is no problem that the roller can not move in the meshing direction smoothly. In this manner, movement of the coil spring toward the narrow side of the wedge-shaped space by the biasing force and movement of the roller toward the wide side of the wedge-shaped space when the centrifugal force is applied are reliably repeated, and even if lock free is repeated, function thereof can reliably be exhibited.

In order to position the spring, a projection which is concentric with the center shaft may be provided. For example, when the coil spring is held by the projection, it is preferable that a gap between the projection and the inner peripheral surface of the coil spring is made greater than a gap between the inner peripheral surface of the coil spring and the end positioning surface, the spring inner side positioning surface, or the spring outer side positioning surface.

Concerning each of the positioning surfaces, it is preferable that the spring end positioning surface and the spring inner side positioning surface are provided on the holder, and the spring outer side positioning surface is provided on the outer ring inner periphery.

With this structure, since the outer ring is directly provided with the spring outer side positioning surface, the center shaft of the spring can be set precisely, and since the holder is provided with the spring end positioning surface and the spring inner side positioning surface, the processing of the outer ring which requires strength can be simplified.

It is preferable that grease having ether base oil is charged between the outer ring and the inner ring.

An example of the ether-based base oil is alkyl diphenyl ether. Antioxidant, anticorrosive additive, extreme pressure additive, solid lubricant or the like is appropriately added to the grease. Pressure viscosity coefficient of the grease is 10 G/Pa or higher.

The ether-based base oil has excellent thermal stability, and when it is used as a belt driving starter of an automobile engine in which idling state is carried out for extremely long time, the base oil exhibit excellent durability.

It is preferable that thickener of the grease is urea. The ether-based base oil constituting the grease has excellent thermal stability, and if the base oil is combined with the urea-based thickener, excellent wear resistance of the grease is exhibited. Therefore, when this base oil is used as a belt driving starter of an automobile engine in which idling state is carried out for extremely long time, the base oil exhibit excellent durability.

A producing method of an inner ring of a one-way clutch according to the present invention is suitable when the above-described pulley unit having a one-way clutch. The producing method of an inner ring used in a one-way clutch comprising an inner ring, an outer ring, a meshing member disposed between both the rings, and a biasing member for biasing the meshing member in a meshing direction, the outer ring is provided with a cam surface, and the meshing member and the inner ring are brought into non-contact state when a centrifugal force is applied, said method comprising a step for processing an outer diameter and an inner diameter by cold forging.

According to the producing method of the inner ring of the one-way clutch, since the inner ring is processed by cold forging not by shaving, the producing cost of the one-way clutch can be reduced.

It is preferable that the method further comprises a step for processing a raceway surface of the bearing on an outer diameter by turning after the cold forging step, and the inner ring of the one-way clutch and the inner ring of the bearing are integrally produced.

In this turning step, a seal groove in which a sealing member is fitted is processed in addition to the raceway surface of the bearing. The one-way clutch is sandwiched between bearings. One of the bearings is a roller bearing having a roller as a rolling element, and the other is a ball bearing having a ball as a rolling element. It is preferable that an outer diameter of each portions of the shaft is set such that an outer diameter of a raceway of the inner ring of the roller bearing=an outer diameter of the inner ring of the one-way clutch=an outer diameter of a raceway shoulder portion of the inner ring of the ball bearing.

With this structure, the number of parts is reduced, the outer diameter of the inner ring is suppressed and thus, size for the one-way clutch is easily secured.

It is preferable that the method further comprises a step for carrying out a thermal processing after the turning step, wherein the thermal processing step comprises a first step for carrying out carbonization processing or carburization hardening processing, a second step for carrying out hardening processing to precipitate fine spherical carbide in a carburization layer, and a third step for carrying out high density carburization hardening processing such that a carbon density on a surface becomes higher than a carbon density on a surface obtained by the first step.

With this structure, shortage of hardness is resolved, wear of the outer peripheral surface of the inner ring is reduced, and the durability is enhanced.

As a result of the thermal processing including the carburization processing, a minimum distance between spherical carbides dispersed and precipitated in a carburization layer matrix of the inner ring of the one-way clutch is set to 15μ or less (more preferably, 10μ or less).

If the minimum distance between the spherical carbides is set to 15μ or less, rolling durability in dirty oil and clean oil is elongated.

As the steel material, there is used a known steel such as JIS SUJ2, JIS SCr420, SAE5120 or the like, ora steel comprising 15 to 0.45% CO by weight, 1.2 to 1.6% Cr by weight, 0.35 to 0.55% Si by weight, 0.35 to 0.65% Mn by weight, a balance of Fe, and inevitable impurities.

In the thermal processing step, it is preferable that a heating temperature in the third step is lower than a heating temperature in the second step. If the heating temperature in the third step becomes higher than the heating temperature in the second step, there is an adverse possibility that a portion of carbide precipitated in the second step is dissolved in the matrix. Such a method will be explained in more detail. That is, the method comprises a first step for heating for three to five hours at a temperature of 930 to 950° in carburization atmosphere including $C_3H_8$ and then, oil cooling; a second step for heating for 0.5 to 0.8 hours at a temperature of 800 to 840° and then, oil cooling; and a third step for heating for three to five hours at a temperature of 790 to 840° and equal to or lower than that of the second step in a carburization atmosphere including $C_3H_8$ and then, oil cooling. It is preferable to heat three to five hours at a temperature of 790 to 820° and equal to or lower than that of the-second step in a carburization atmosphere including $C_3H_8$ and then, to increase the temperature at 830 to 840° for 0.5 to 0.8 hours and then, oil cooling. In this case, it is possible to increase the amount of carbide without increasing the carbide in size.

It is preferable that a surface hardness of the inner ring is 58 to 67 with a Rockwell hardness C (HRC, hereinafter). If the surface hardness is lower than HRC58, the surface hardness is not sufficient, and when a one-way clutch using this inner ring is used in a dirty oil in which foreign matters are mixed, flaw such as indentation caused by foreign matter which becomes a peel-off starting point is prone to be generated on a surface of the inner ring, wear-resistance is lowered, and lifetime of the bearing is shortened, and if the surface hardness exceeds HRC67, toughness is lowered.

Further, it is preferable that average particle diameter of the spherical carbide is equal to or lower than 5 μm. If the average particle diameter of the spherical carbide exceeds 5 μm, there is an adverse possibility that spherical carbides whose average particle diameter exceed 5 μm assumes about 80% of total carbides and as a result, stress concentrates on the spherical carbide exceeding 5 μm, and destroy is generated from this portion. Therefore, the average particle diameter of the spherical carbide should be equal to or lower than 5 μm or lower, more preferably, lower than 3 μm. If spherical carbides whose particle diameter is less than 5 μm assume lower than 70%, this means that spherical carbides whose particle diameter exceed 5 μm assume 30% or more, and maximum diameter is 10 μm and as a result, stress concentrates on spherical carbides whose particle diameter exceed 5 μm, and there is an adverse possibility that destroy is generated from this portion. Therefore, it is preferable that spherical carbides whose particle diameter is 5 μm or less assume 70% of total.

DETAILED EXPLANATION OF PREFERRED CONCRETE EXAMPLE

An embodiment of the present invention will be explained below with reference to the drawings.

Figure 1:
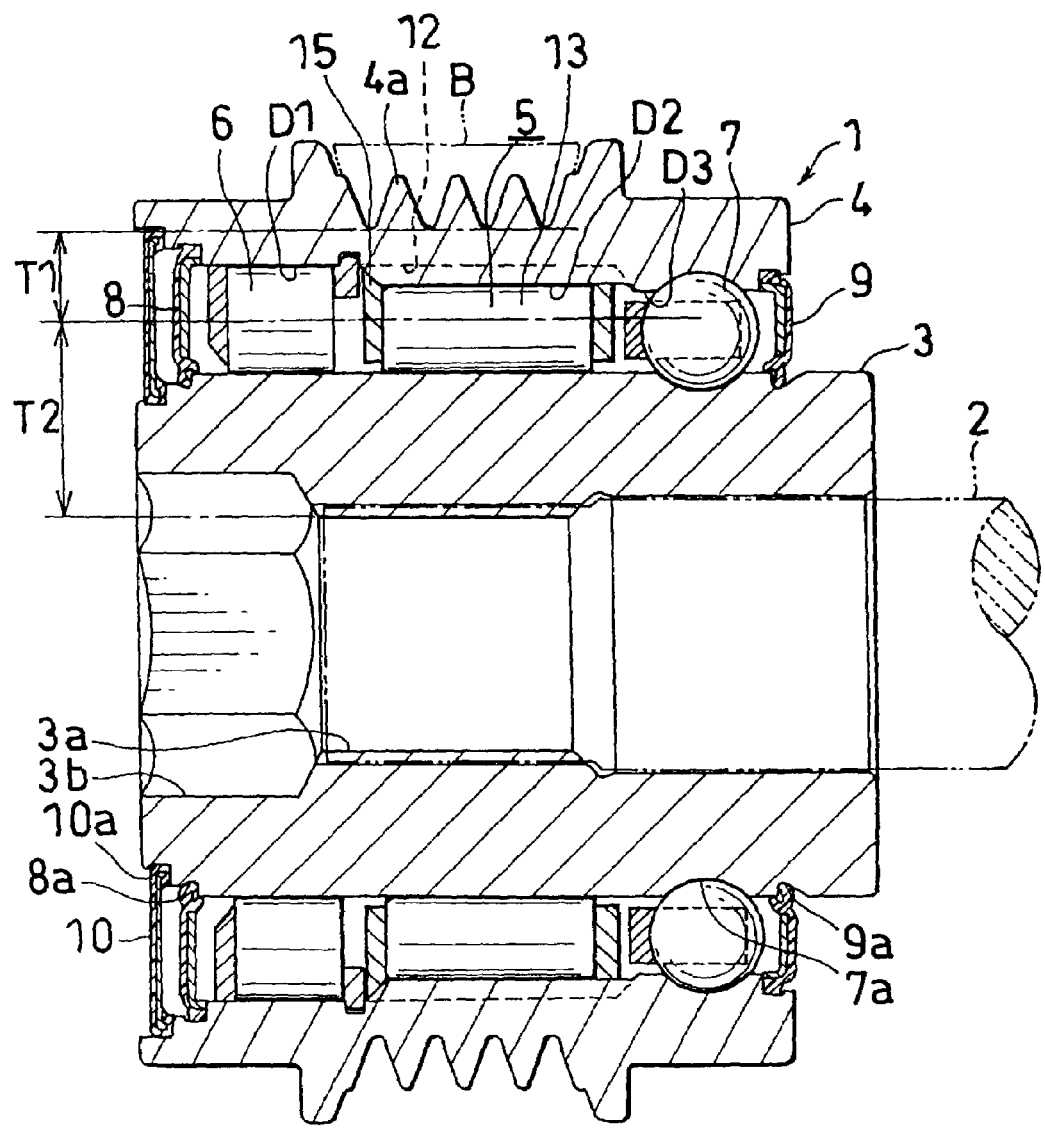
FIG. 1 is a vertical sectional view showing a pulley unit having a one-way clutch of the present invention.

FIG. 1 shows a pulley unit having a one-way clutch of this invention. A pulley unit (1) having the one-way clutch is disposed in a portion of the engine which connects a driving section and a recessed surface of a starter motor. A one-way clutch (5) is provided between a hollow shaft (3) fitted to the rotation shaft (2) of the starter motor and a pulley (4) concentrically disposed around the hollow shaft (3). The pulley (4) is provided at its outer periphery with a belt-winding portion (4a) around which a V-ribbed belt (B) is wound.

The one-way clutch (5) is provided between the hollow shaft (3) and an intermediate portion of the pulley (4) in its axial direction. Between ends of the hollow shaft (3) and the pulley (4), a roller bearing (6) and a ball bearing (7) are provided such as to sandwich the one-way clutch (5). The pulley (4), an outer ring of the one-way clutch (5) and outer rings of the bearings (6) and (7) are integrally formed together, and the hollow shaft (3), the inner ring of the one-way clutch (5) and inner rings of the bearings (6) and (7) are integrally formed together so that the number of parts is reduced.

Seal members (8) and (9) are respectively disposed at axially outsides of the roller bearing (6) and the ball bearing (7). Another seal member (10) is disposed at a free end (left end in the drawing) of the pulley unit for preventing muddy water from entering the pulley unit.

Figure 2:
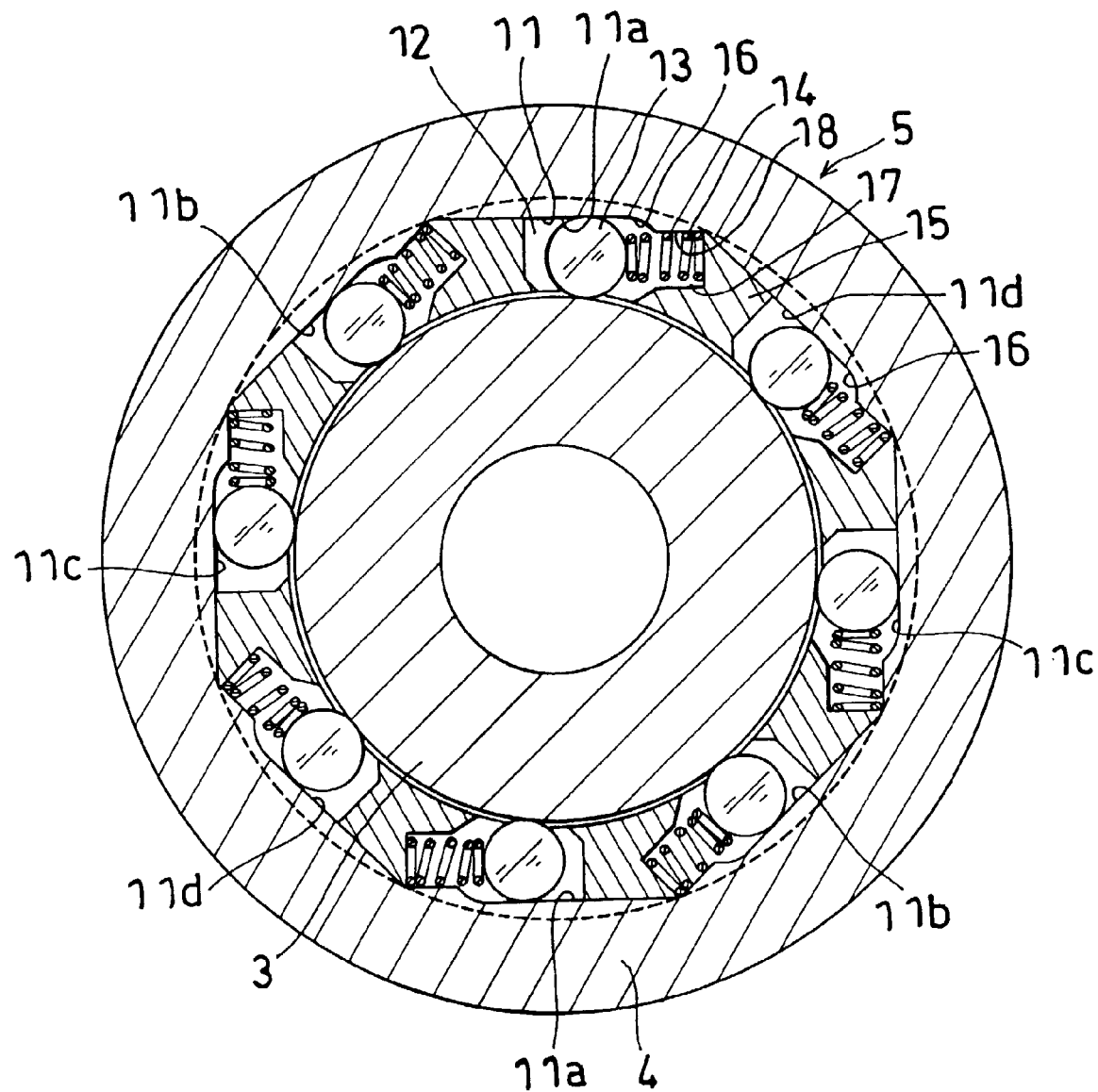
FIG. 2 is a transverse sectional view of the same.

As shown in FIG. 2, the one-way clutch (5) comprises a cam surface (11) disposed on an inner peripheral surface of the pulley (4); rollers (13) as a plurality of meshing members; a coil spring (14) as a biasing member for biasing the rollers (13) toward a narrow side of a wedge-shape space (12) in a meshing direction; and a holder (15) for positioning the rollers (13) in the wedge-shape space (12). The rollers (13) are disposed in the wedge-shape space (12) formed by the cam surface (11) and an outer peripheral surface of the hollow shaft (3). If the hollow shaft (3) and the pulley (4) are relatively rotated in one direction (lock direction), the rollers (13) mesh between the hollow shaft (3) and the pulley (4), and if the hollow shaft (3) and the pulley (4) are relatively rotated in the other direction (free direction), the rollers (13) release the meshing state.

Figure 3:
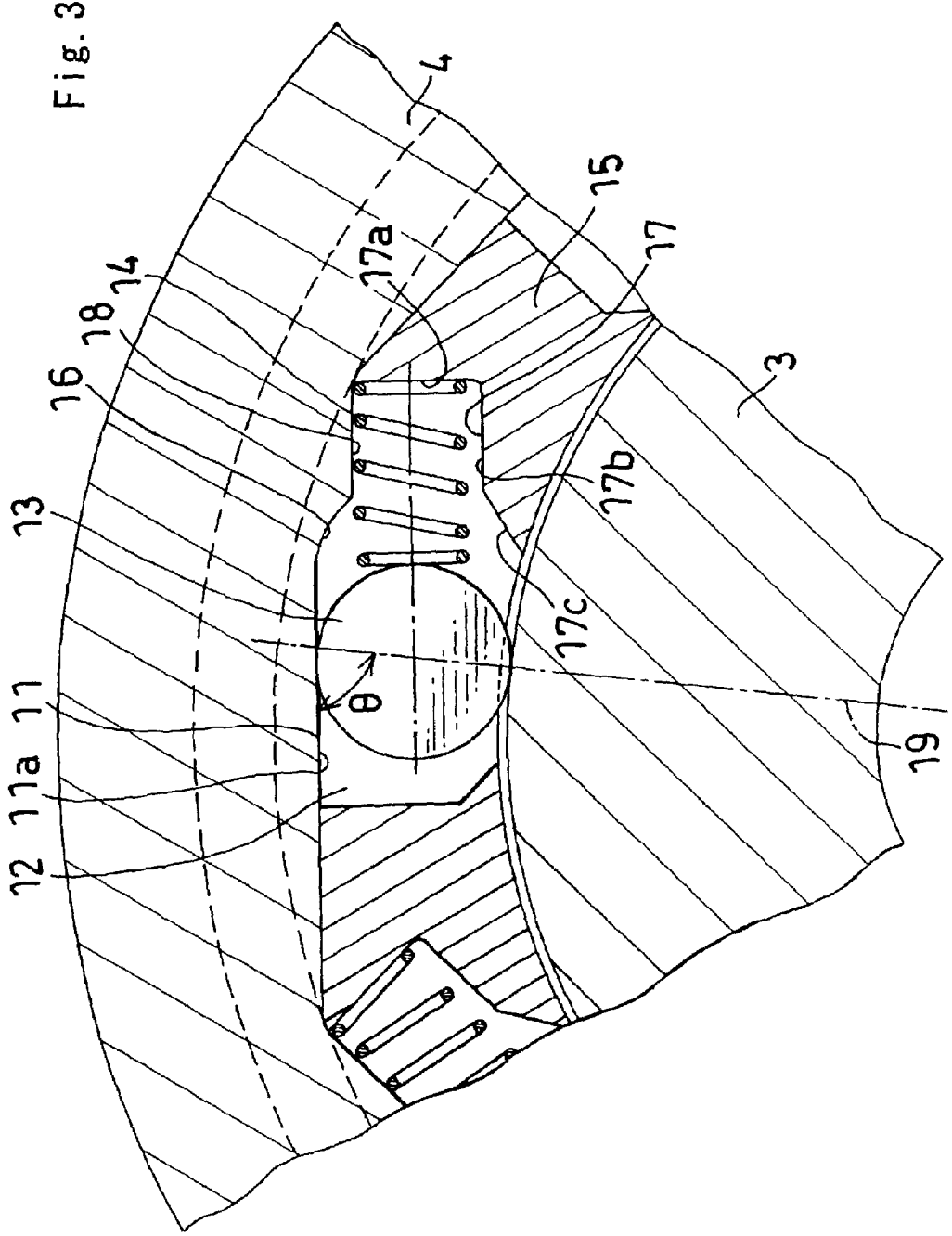
FIG. 3 is an enlarged view of a portion in FIG. 2, and shows a meshing state of the one-way clutch.

The cam surface (11) comprises a plurality sets (four sets in this embodiment) of parallel two surfaces (11a), (11b), (11c) and (11d) arranged in the circumferential direction such as to be opposed to each other while sandwiching its axial center. Each of the surfaces of the parallel two surfaces (11a), (11b), (11c) and (11d) forms not a right angle with respect to a normal (19) passing a center of the roller (13) and the axial center, but forms an acute angle slightly smaller than a right angle as shown in FIG. 3 which is an enlarged view of a portion of FIG. 2. Since the pulley (4) has a cam surface (11), the pulley (4) has a function as the outer ring of the one-way clutch (5), and the pulley (4) and the outer ring of the one-way clutch (5) are integrally formed together. With this structure, it is possible to increase the P.C.D of the roller (13) while suppressing an outer diameter of the pulley (4), and a centrifugal force acting on the roller (13) becomes great.

A wide side end of the wedge-shape space (12) of each of the parallel two surfaces (11a), (11b), (11c) and (11d) is provided with a holding recessed surface (16) for stopping the roller (13) which has an arc transverse cross section and receives a centrifugal force. The recessed surface (16) is an arc having substantially the same radius as that of the outer peripheral surface of the roller (13).

As shown in FIG. 1, an inner diameter of the pulley (4) has a step. Concerning sizes corresponding to functions of the outer ring of the roller bearing (6), the outer ring of the one-way clutch (5), and the outer ring of the ball bearing (7) possessed by the pulley (4), $D1>D2 \geqq D3$ is satisfied, wherein D1 is an inner diameter of a raceway of the outer ring of the roller bearing (6), D2 is a minimum inner diameter of the outer ring of the one-way clutch (5) (distance between the parallel two surfaces of the outer ring cam surface (11)), and D3 is an inner diameter of raceway shoulder portion of the outer ring of the ball bearing (7).

An outer diameter of the hollow shaft (3) is constant except its groove, and the inner ring raceway outer diameter of the roller bearing (6)=inner ring outer diameter of the one-way clutch (5)=raceway shoulder portion outer diameter of the outer ring of the ball bearing (7). With this structure, the outer diameter of the inner ring is suppressed, and a size of the one-way clutch is easily secured.

A diametrical distance T1 between an innermost diameter portion of the outer periphery of the pulley in the belt-winding portion (4a) and a center of the rollers (13) in the meshing starting position is smaller than a diametrical distance T2 between the center of the rollers (13) in the meshing starting position and a minimum inner diameter portion of the inner periphery of the hollow shaft (3). That is, if substantial thicknesses of the pulley (4) and the hollow shaft (3) are compared, the thickness of the pulley (4) is thinner. With this structure, it is possible to increase the P.C.D of the roller (13) while suppressing the outer diameter of the pulley (4), and a centrifugal force acting on the roller (13) becomes greater.

The coil spring (14) has a center shaft in its transverse cross section, the coil spring (14) is of elliptic shape, and its direction of long diameter coincides with an axial direction of the one-way clutch (5). A length of its short diameter, i.e., a size in a diametrical direction of a portion of the coil spring (14) abutting against the roller is smaller than a diameter of the roller (13).

The holder (15) is made of synthetic resin, and has an outer peripheral shape substantially along the cam surface (11) and an inner peripheral shape along the outer peripheral surface of the hollow shaft (3), and is press-fitted into the cam surface (11). A slight gap is provided between the holder (15) and the outer periphery of the hollow shaft (3). The holder (15) is provided with a spring-receiving recess (17) for positioning the coil spring (14). Grease is charged into the spring-receiving recess (17).

The spring-receiving recess (17) is connected to the roller holding recessed surface (16) of the cam surface (11), and constantly maintains a direction of the center shaft of the coil spring (14) by cooperation with a spring positioning surface (18) provided on the inner periphery of the pulley (4). The center shaft of the coil spring (14) is inclined with respect to a tangent direction of the outer peripheral surface of the hollow shaft (3) so that when a centrifugal force is applied to the coil spring (14), the center shaft can be deformed in a direction reducing a biasing force against the roller (13). Like the cam surface (11), the spring positioning surface (18) of the pulley (4) comprises four sets of parallel two surfaces opposed to each other while sandwiching a shaft center of the one-way clutch (5). The four sets of parallel two surfaces are arranged in the circumferential direction.

Figure 4:
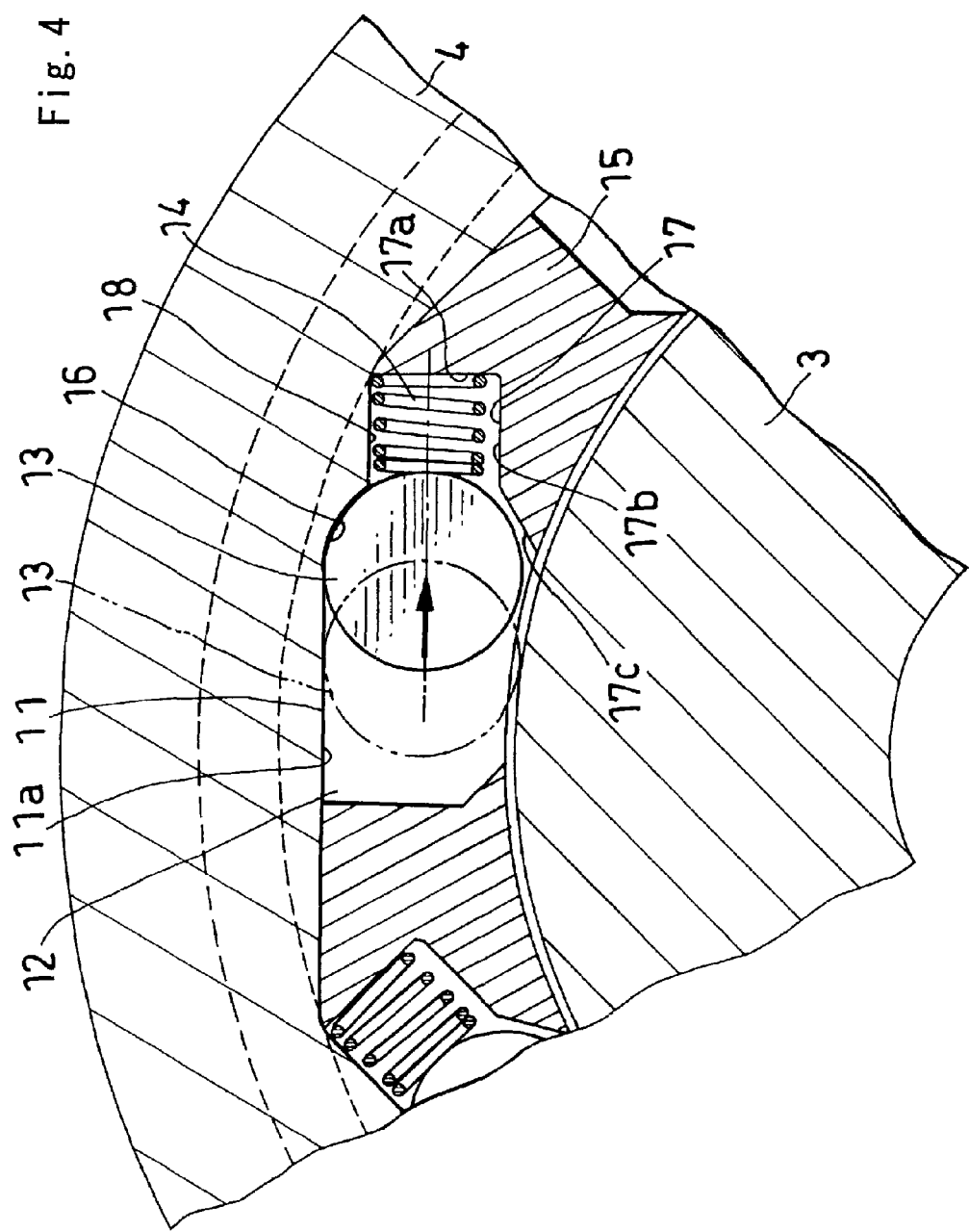
FIG. 4 is an enlarged view of a portion in FIG. 2, and shows a meshing-releasing state of the one-way clutch.

As shown with symbols (17a) and (17b) in FIGS. 3 and 4, the spring-receiving recess (17) comprises a spring end positioning surface (17a) for preventing the coil spring (14) from moving in an axial direction of the spring, and a spring inner side positioning surface (17b) for preventing the coil spring (14) from moving inward perpendicular to the spring axis. The spring positioning surface (18) of the pulley (4) is a spring outer side positioning surface for preventing the coil spring (14) from moving outward perpendicular to the spring axis. By these spring positioning surfaces (17a), (17b) and (18), the center shaft of the coil spring (14) is held in parallel to the parallel two surfaces (11a), (11b), (11c) and (11d) of the cam surface (11) as shown in FIG. 3.

Figure 5:
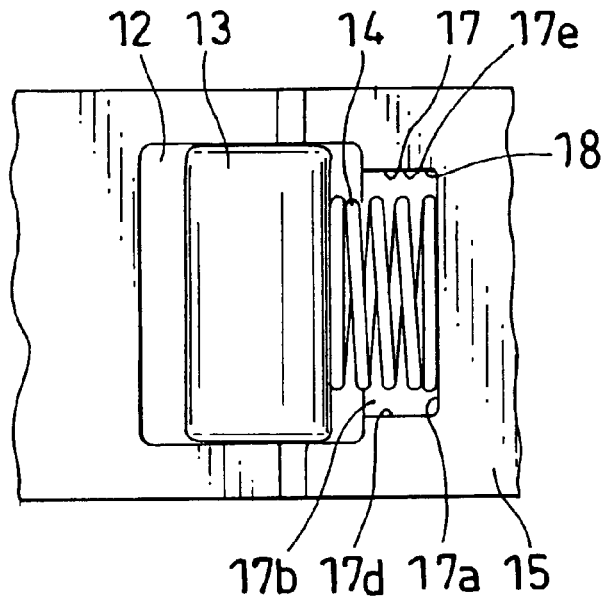
FIG. 5 is a diagram of a holder which is viewed from diametrically outside, in which a vertical direction of the drawing coincides with an axial direction of the one-way clutch.

FIG. 5 is a diagram of a portion of the holder (15) which is viewed from diametrically outside. As shown with symbols (17d) and (17e) in FIG. 5, the spring-receiving recess (17) has axial direction-positioning surfaces (17d) and (17e) for preventing the coil spring (14) from moving in the axial direction of the one-way clutch (5).

A roller holding slant surface (17c) is connected to the spring inner side positioning surface (17b) of the spring-receiving recess (17). The other end of the slant surface (17c) has a slight gap between itself and the outer peripheral surface of the hollow shaft (3). By the roller holding recessed surface (16) which is a roller holding surface and the roller holding slant surface (17c) which is a roller holding surface, a roller holding portion having a transverse cross section of becomes substantially folding-fan shape. The roller holding portion receives the roller (13) which moved in the meshing-releasing direction.

FIGS. 2 and 3 show a state in which a centrifugal force is not applied to the roller (13) and the coil spring (14). If the hollow shaft (3) is rotated in a counterclockwise direction in this state, the roller (13) meshes between the hollow shaft (3) and the pulley (4), and the hollow shaft (3) and the pulley (4) are rotated integrally. When the pulley (4) rotates at high speed and the rotation of the hollow shaft (3) is stopped, a direction of the centrifugal force (outward direction shown with a line (19)) acting on the roller (13) and a normal direction in a point at which the roller (13) contact with the parallel two surfaces (11a), (11b), (11c) and (11d) are deviated and thus, forces along the parallel two surfaces (11a), (11b), (11c) and (11d) are applied to the rollers (13), and the rollers (13) move toward the wide side of the wedge-shape space (12) as shown with an arrow in FIG. 4.

In this state, the recessed surface (16) which is the roller holding surface is the arc in transverse cross section having substantially the same radius as that of the outer peripheral surface of the roller (13). Therefore, an outer peripheral portion of the roller (13) having the cylindrical surface is just fitted into the recessed surface (16), and the slant surface (17c) which is the roller holding surface of the holder (15)

appears from diametrically inside. Thus, the roller (13) is not inclined, and a gap between the outer periphery of the hollow shaft (3) and the roller (13) is secured, and the non-contact state between the hollow shaft (3) and the roller (13) is established.

When the above pulley unit having the one-way clutch is used for a belt driving starter, it is required for grease to have excellent meshing ability, wear resistance and thermal stability. The meshing ability and the wear resistance with respect to the meshing ability are characteristics required for general one-way clutches, but were resistance with respect to the thermal stability and slip are characteristics required when idling is frequently used, and if both the wear resistance and thermal stability are satisfied, durability of the pulley unit having a one-way clutch is secured. Using condition of the belt driving starter is that angular acceleration is 300 to 400 rad/sec², and a temperature is about 10 to 200°.

In the grease used in the pulley unit having the one-way clutch, base oil is ether. An example of the ether-based base oil is alkyl diphenyl ether. A antioxidant, anticorrosive additive, extreme pressure additive, solid lubricant or the like is appropriately added to the grease. The pressure viscosity coefficient of the grease is 10 G/Pa or higher. A thickener of the grease is urea.

Next, a prehistory for obtaining the grease having the ether-based base oil and urea-based thickener will be explained.

Table 1 shows a relation between kinds and characteristics of the base oil of the grease. From the Table, concerning the thermal stability, ether-based polyphenyl ether is most excellent, but polyphenyl ether is inferior in wear resistance, and it is necessary to enhance the wear resistance in order to enhance the durability.

[Table 1]

Kinds and characteristics of base oil (cited from [Technique and market of high function lubricant: issued by CMC]) 4: excellent, 3: good, 2: normal, 1: bad

| Base oil | Using temperature range (° C.) | Viscosity index (VI$_E$) | Thermal stability | Load resistance (Wear resistance) | Cost |
|---|---|---|---|---|---|
| Mineral oil | −10–180 | 50–130 | 2 | 3 | 4 |
| Poly α olefin | −50–200 | 50–180 | 3 | 3 | 3 |
| Diester | −70–150 | 110–190 | 2 | 4 | 3 |
| Polyol ester | −50–200 | 60–190 | 3 | 4 | 2 |
| Polyphenyl ether | −40–200 | −100–10 | 4 | 2 | 2 |
| Silicone | −70–220 | 100–500 | 3 | 1 | 1 |

*viscosity index: in viscosity temperature relation indicating method, as this value is greater, viscosity variation caused by a temperature is smaller. The viscosity index is calculated from kinetic viscosity of 40° C. and 100° C.

In a one-way clutch in which idling is carried out for a long time, it is especially important that wear at the time of idling is reduced. Thus, it is necessary to select grease having great oil film thickness and excellent meshing ability. The oil film thickness can be used as index of wear resistance, and if this thickness is great, wear is reduced. Table 2 shows comparison between grease having the base oil and oil thickness in conditions of wedge angle of 9°, spring load of 1N, a temperature of 100° C. and engine revolution number of 500 rpm.

TABLE 2

| Base oil | Oil film thickness (μm) |
|---|---|
| Alkyl diphenyl ester | 0.27 |
| Polyol ester | 0.16 |
| Poly α olefin | 0.21 |
| Diester | 0.11 |

It is found from Table 2, that grease having alkyl diphenyl ether as the base oil has great oil film thickness, and has high effect to reduce wear of the cam surface (11) and the roller (13) in the one-way clutch at the time of idling.

Figure 6:
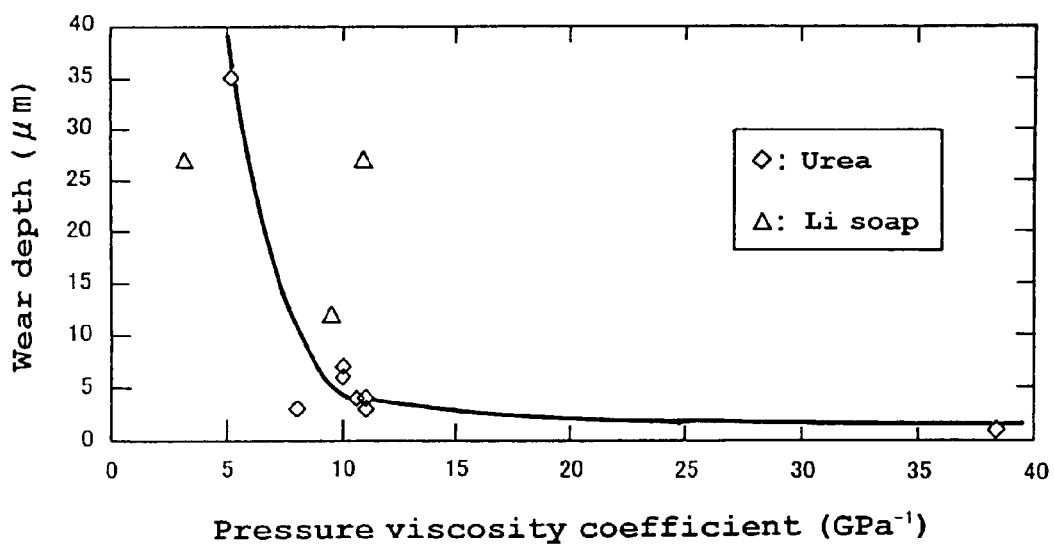
FIG. 6 is a graph showing a result of measurement of relation between a temperature of grease and meshing acceleration using two kinds of greases.

Table 3 shows a result of evaluation of characteristics of five kinds of greases and wear, and FIG. 6 shows a result of measurement of a relation of pressure viscosity coefficient and wear depth of grease measured for two kinds of greases (two kinds, i.e., grease having ether-based base oil and urea as thickener, and Li soap).

TABLE 3

| | thickener | pressure viscosity coefficient (G/Pa) | Wear depth (μm) |
|---|---|---|---|
| Polyol ester | urea | 11 | 4 |
| Alkyl diphenyl ester | urea | 11.1 | 4 |
| Diester | Li soap | 9.5 | 12 |
| Ester | Li soap | 10.9 | 27 |

In the result shown in FIG. 6, a solid line indicates a egression curve using the urea-based thickener. It is found from the results in Table 3 and FIG. 6 that if the urea-based thickener is used and the pressure viscosity coefficient is set to 10 G/Pa or higher, even if ether-based (alkyl diphenyl ether in this example) base oil which is inferior in wear resistance to polyol ester is used, the wear depth in the cam surface (11) of the roller (13) by meshing in the one-way clutch at the time of meshing is not inferior as compared with grease using polyol ester as the base oil. As described above, the polyphenyl ether is superior to polyol ester in thermal stability, and it is found that a grease using alkyl diphenyl ether as the base oil and urea-based compound as thickener exhibit extremely excellent durability together with the wear resistance and the thermal stability.

Figure 7:
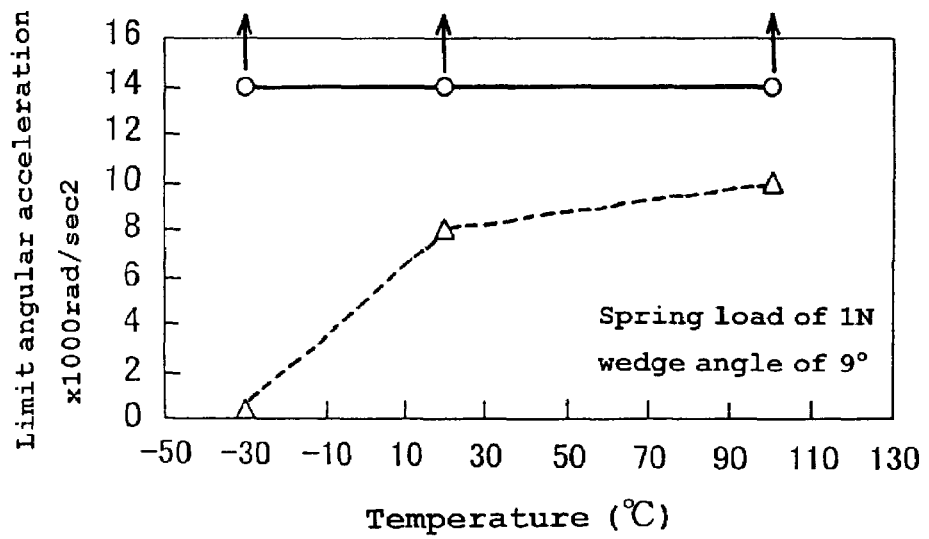
FIG. 7 is a graph showing a result of measurement of relation between a viscosity of grease and wear depth using two kinds of greases.

FIG. 7 shows a relation between a temperature and acceleration in which meshing slip is generated in grease 1) (shown with broken line) in which base oil which is one example of grease using ether-base oil and thickener is urea-based compound, and grease 2) (shown with solid line) in which base oil is polyol ester and thickener is urea-based compound.

From FIG. 7, it is found that 2) (polyol ester+urea) is superior in meshing ability to alkyl diphenyl ether+urea). However, at a temperature equal to or higher than 100° C. which is the using condition in the belt driving starter, 1) satisfies 300 to 400 rad/sec². Therefore, the grease using ether-based base oil is superior in thermal stability, wear resistance against the meshing, and wear resistance at the time of idling, and shows excellent meshing ability in the using condition of the belt driving starter for example, and is suitable for grease of a one-way clutch in which idling is carried out for a long time.

This pulley unit having the one-way clutch is actuated in the following manner. First, when the engine is to be started, the hollow shaft (3) which is integral with the rotation shaft (2) of the starter motor is rotated in a counterclockwise direction. With this, the rollers (13) are meshed in the narrow side of the wedge-shape space (12) of the one-way clutch (5), the driving force is transmitted, and the hollow shaft (3) and the pulley (4) are integrally rotated. The pulley (4) is connected to a crankshaft through a belt, and the engine is started by rotation of the pulley (4). When the engine is started, the starter is stopped, and the pulley (4) keeps rotating in the counterclockwise direction. With this, the meshing state of the rollers (13) is released, and a state in which only the pulley (4) rotates is continued. Especially when the engine rotates at high speed, each of the rollers (13) is positioned by the recessed surface (16) having substantially the same curvature as that of the roller (13), and the hollow shaft (3) is brought into the non-contact state. The coil spring (14) receives a force in a direction shrunk by the centrifugal force, a resilient force for biasing the roller (13) in the meshing direction is reduced, and the non-contact state between the roller (13) and the hollow shaft (3) is secured. Since the moving direction of the roller (13) when the centrifugal force is applied and the direction of the center shaft of the coil spring (14) coincide with each other, the coil spring (14) is deviated when the roller (13) moves, the biasing force direction of the coil spring (14) when the pulley (4) is stopped is not changed, and the problem that the roller (13) can not move toward the meshing direction smoothly is not generated.

When this pulley unit (1) having the one-way clutch is assembled, balls of the ball bearing (7) and the holder, the coil spring (14) of the one-way clutch (5) and the rollers (13), rollers of the roller bearing (6), and the holder are inserted between the pulley (4) and the hollow shaft (3) in this order. As described above, the raceway inner diameter (DI) of the outer ring of the roller bearing (6)>the distance between the parallel two surfaces of the cam surface (11) of the outer ring of the one-way clutch (5) (minimum inner diameter (D2) of the outer ring of the one-way clutch) ≧raceway shoulder portion inner diameter (D3) of the outer ring of the ball bearing (7). Therefore, working space is secured diametrically outside is secured when each element is inserted, and the assembling operation is facilitated.

Although the coil spring is indicated as means for biasing the roller (13), it is also possible to use, instead of the coil spring, a leaf spring or the like. Although the meshing member of the one-way clutch is roller (13) in the above description, a one-way clutch whose meshing member is sprag can also be used only if the one-way clutch is constituted such that the meshing member and the biasing member are rotated integrally with the outer ring, the meshing member moves in the meshing-releasing direction by a centrifugal force when the rotation speed of the outer ring is equal to or higher than a predetermined speed, and the biasing force of the biasing member has enough magnitude for permitting this movement.

As shown in FIG. 1, the outer diameter of the hollow shaft (3) is provided with seal grooves (8a), (9a) and (10a) into which inner diameter portions of the raceway surface (7a) of the ball bearing (7) and the seal members (8), (9) and (10) are fitted. The inner diameter portion of the hollow shaft (3) is provided with a female thread portion (3a) threaded to a male thread portion provided on an end of the rotation shaft (2), and a hexagonal engaging groove (3b) into which a hexagonal wrench used when the hollow shaft (3) is rotated and threadedly engaged with the end of the rotation shaft (2).

Since the outer diameter of the hollow shaft (3) is constant except the raceway surface (7a) and the seal members (8), (9) and (10), the hollow shaft (3) can be processed by cold forging not by shaving and with this, the processing cost of the pulley unit having a one-way clutch can be reduced. It is preferable that HRC of the hollow shaft (3) is 58 to 67 (e.g., about 64).

Figure 8:
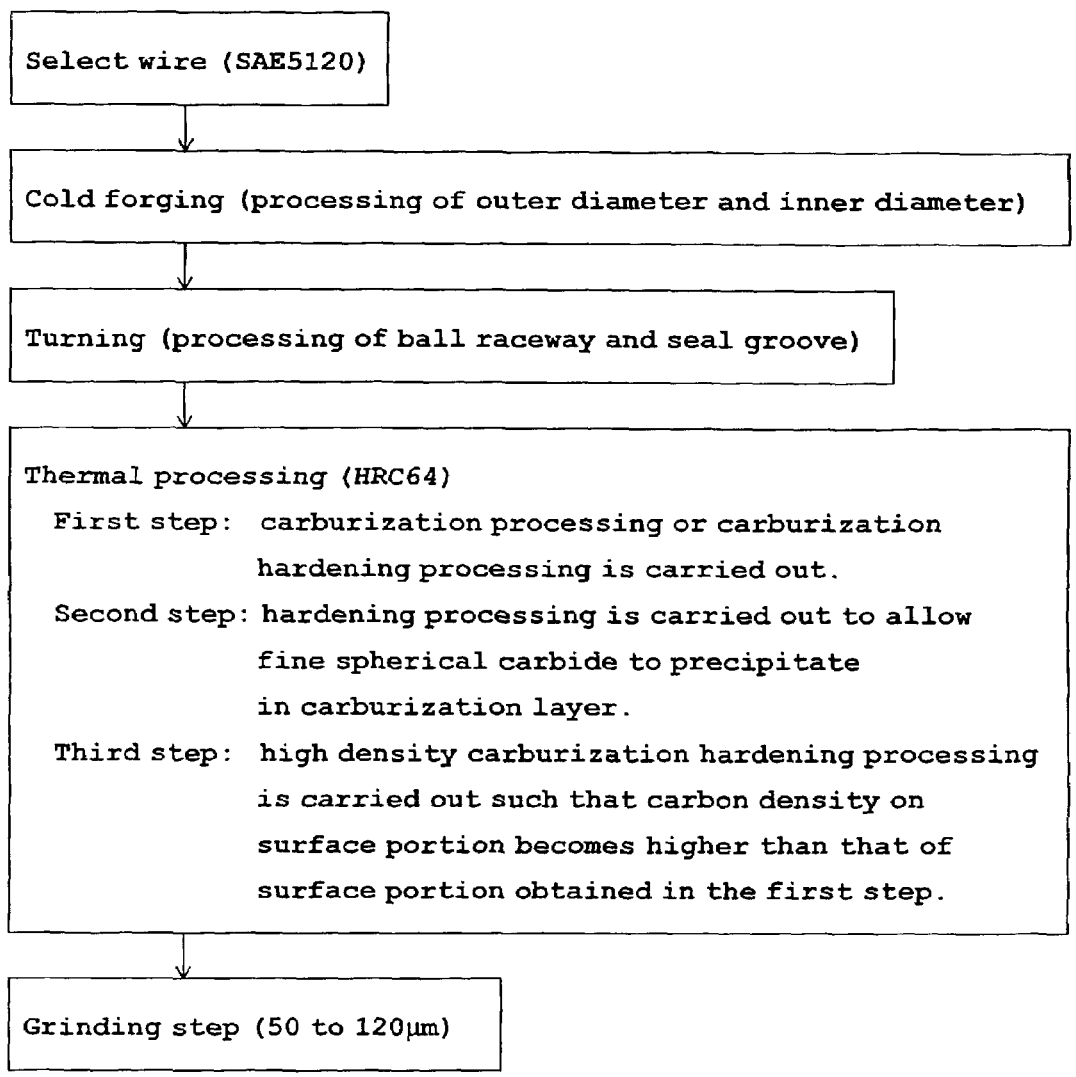
FIG. 8 is a block diagram showing steps of a producing method of an inner ring of the one-way clutch of the present invention.
Figure 9:
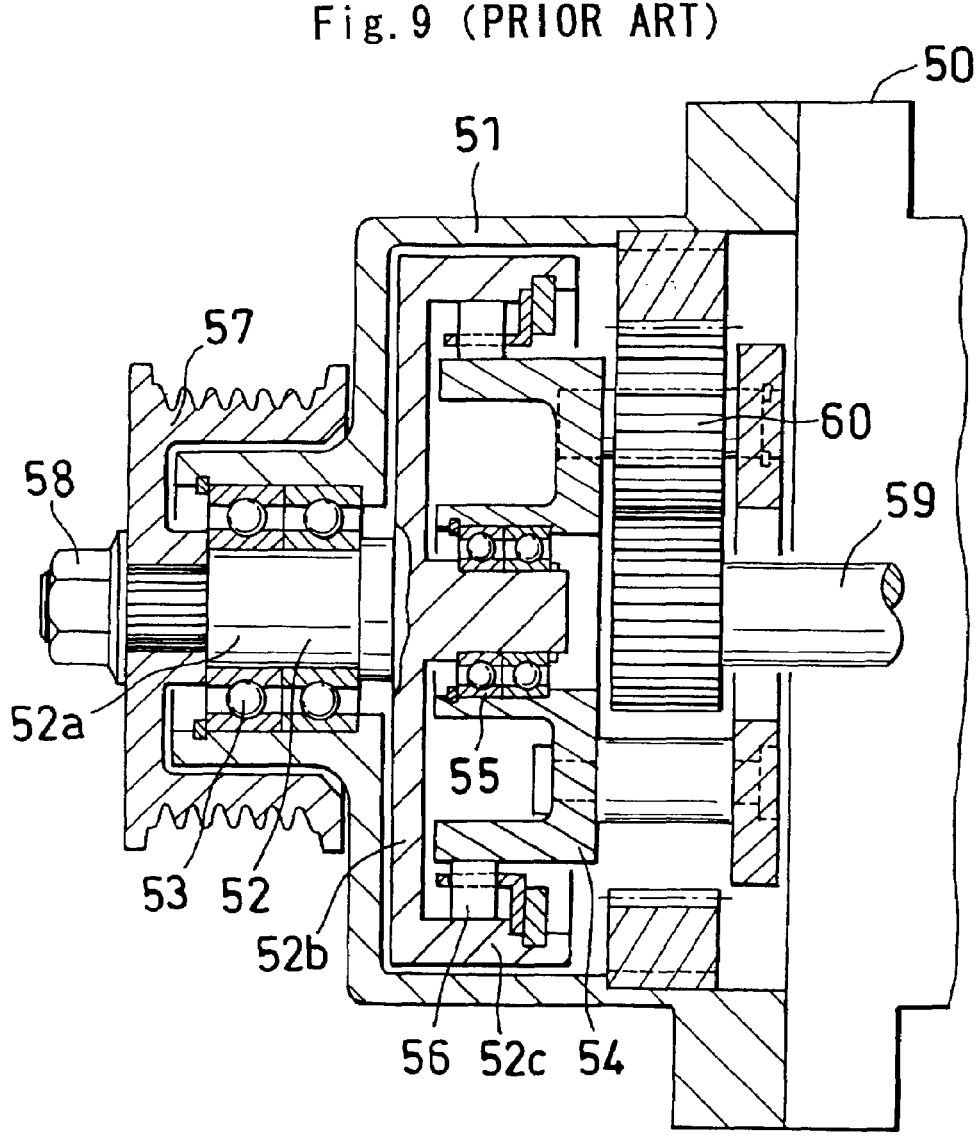
FIG. 9 is a vertical sectional view showing a conventional pulley unit having a one-way clutch.

The hollow shaft (3), i.e., the inner ring of the one-way clutch is produced by steps shown in FIG. 8.

First, in a wire selecting step, steel material SAE5120 is selected. Then, an outer diameter and an inner diameter thereof are processed by cold forging. The outer diameter is formed into a cylindrical surface, and the inner diameter is formed with the female thread portion (3a) and the hexagonal engaging groove (3b). Next, an outer diameter of the material is formed with the raceway surface (7a) and seal grooves (8a), (9a) and (10a) for the seal members (8), (9) and (10). Next, the material is subjected to thermal processing and then, a surface of the material is ground to obtain the hollow shaft (3).

The thermal processing is carried out using a fluid layer furnace. The thermal processing comprises a first step in which $N_2$ gas is supplied as fluidization gas and $C_3H_8$ gas is supplied and it is heated for three hours at 930° C. and then, it is oil cooled to 80° C., carburization hardening (or carburization processing) is carried out; a second step in which $N_2$ gas is supplied as fluidization gas and it is heated for 0.5 hour at 840° C. and then it is oil cooled to 80° C. to carry out hardening processing; and a third step in which $N_2$ gas is supplied as fluidization gas and $C_3H_8$ gas is supplied and it is heated for five hours at 830° C. and then, it is oil cooled to 80° C., and high density carburization hardening processing is carried out.

By the second step, fine spherical carbide is precipitated in a carburization layer, and the third step, carbon density on the surface becomes higher than that on the surface obtained by the first step. With this, shortage of hardness is resolved, wear of the outer peripheral surface of the inner ring is reduced, and the durability is enhanced.

As a result of the thermal processing including the carburization processing, a distance between spherical carbides dispersed and precipitated in a carburization layer matrix of the inner ring of the one-way clutch is set to 15μ or less (more preferably, 10μ or less). It is considered that a factor for reducing the minimum distance between most close particles to 15 μm or less resides in alloy composition of steel material used for forming the same or thermal processing condition including the carburization processing, but it is not clearly known how the alloy composition and the thermal processing condition influences the distance between the spherical carbides.

The invention claimed is:

1. A pulley unit having a one-way clutch comprising a one-way clutch which has an inner ring fitted to a rotation shaft of a starter motor, an outer ring fitted to a pulley, a meshing member disposed between both the rings, and a biasing member for biasing the meshing member in a meshing direction wherein at least one bearing is provided between the shaft and the pulley, in the one-way clutch, the meshing member and the biasing member are rotated integrally with the outer ring, and wherein the biasing member is oriented such that when a centrifugal force is applied, the biasing member is deformed due to a mass of the biasing member in a direction reducing a biasing force with respect to the meshing member so that when the rotation speed of the outer ring becomes equal to or greater than a predetermined speed, the meshing member moves in the meshing-releasing direction to a free condition to allow only the pulley being rotated and when the rotation speed of the outer ring becomes smaller than the predetermined speed, the meshing member moves in the meshing direction to a lock condition and a the biasing force of the biasing member has enough magnitude to allow these meshing member movements.

2. The pulley unit having a one-way clutch according to claim 1, wherein the pulley and the outer ring of the one-way clutch are integrally formed.

3. The pulley unit having a one-way clutch according to claim 2, wherein the one-way clutch is provided between the shaft and an axially intermediate portion of the pulley, a roller bearing and a ball bearing are disposed between the shaft and the pulley through the one-way clutch.

4. The pulley unit having a one-way clutch according to claim 3, wherein the shaft is hollow, and the pulley has a belt-winding portion around which a belt is wound, and a diametrical distance T1 between an innermost diameter portion of an outer periphery of the pulley in the belt-winding portion and a center of the meshing member is smaller than a diametrical distance T2 between a center of the meshing member in a meshing starting position and a minimum inner diameter portion of an inner periphery of the shaft.

5. The pulley unit having a one-way clutch according to claim 1, wherein the outer ring has a cam surface, the cam surface and an outer peripheral surface of the inner ring form a wedge-shaped space, the meshing member is a roller disposed in the wedge-shaped space, the one-way clutch further has a holder for holding the roller and the biasing member, and a roller holding portion which is formed in a wider portion in the wedge-shaped space by a roller holding surface provided on an inner periphery of the outer ring and a roller holding surface provided on an inner periphery of the holder, and which holds the roller which moved in the meshing-releasing direction in a non-contact state with the inner ring.

6. The pulley unit having a one-way clutch according to claim 5, wherein the roller holding surface of the outer ring is a recessed surface having an arc transverse cross section.

7. The pulley unit having a one-way clutch according to claim 1, wherein the outer ring has a cam surface, the cam surface and an outer peripheral surface of the inner ring form a wedge-shaped space in which the meshing member is disposed, the biasing member is a spring which biases the meshing member toward a narrow portion of the wedge-shaped space, the one-way clutch further has a holder for holding the meshing member and the spring, the spring has an axis which is inclined in a tangent direction of the outer peripheral surface of the inner ring so that the spring can be deformed in a direction in which a biasing force of the spring biasing the meshing member is reduced when a centrifugal force is applied, and the one-way clutch has a spring end positioning surface for preventing the spring from moving in an axial direction of the spring, a spring inner side positioning surface for preventing the spring from moving inward which is perpendicular to a spring axis, and a spring outer side positioning surface for preventing the spring from moving outward which is perpendicular to the spring axis.

8. The pulley unit having a one-way clutch according to claim 7, wherein the holder is provided with the spring end positioning surface and the spring inner side positioning surface, and the outer ring is provided at its inner periphery with the spring outer side positioning surface.

9. The pulley unit having a one-way clutch according to claim 1, wherein the meshing member is a roller and grease having ether base oil is charged between the outer ring and the inner ring.

10. The pulley unit having a one-way clutch according to claim 9, wherein thickener of the grease is urea.

11. The pulley unit having a one-way clutch according to claim 2, wherein grease having ether base oil is charged between the outer ring and the inner ring.

12. The pulley unit having a one-way clutch according to claim 11, wherein thickener of the grease is urea.

13. The pulley unit having a one-way clutch according to claim 3, wherein grease having ether base oil is charged between the outer ring and the inner ring.

14. The pulley unit having a one-way clutch according to claim 13, wherein thickener of the grease is urea.

15. A one-way clutch comprising an inner ring being fitted to a rotation shaft of a starter motor, an outer ring being fitted to a pulley, a meshing member disposed between both the rings, and a biasing member for biasing the meshing member in a meshing direction, the meshing member and the biasing member are rotated integrally with the outer ring, and wherein the biasing member is oriented such that when a centrifugal force is applied, the biasing member is deformed due to a mass of the biasing member in a direction reducing the biasing force with respect to the meshing members so that when the rotation speed of the outer ring becomes equal to or greater than a predetermined speed, the meshing member moves in the meshing-releasing direction to a free condition to allow only the pulley being rotated and when the rotation speed of the outer ring becomes smaller than the predetermined speed, the meshing member moves in the meshing direction to a lock condition and a biasing force of the biasing member has enough magnitude to allow these meshing member movements.

16. A one-way clutch comprising an inner ring being fitted to a rotation shaft of a starter motor, an outer ring being fitted to a pulley, a cam surface provided on an inner peripheral surface of the outer ring, a meshing member which is disposed in a wedge-shaped space formed by the cam surface and an outer peripheral surface of the inner ring, a biasing member for biasing the meshing member in a meshing direction, and a holder for holding the meshing members and the biasing members, wherein the biasing member has an axis which is inclined with respect to a tangent direction of the outer peripheral surface of the inner ring along a radial line passing through the biasing member so that the biasing member can be deformed in a direction in which a biasing force of the biasing member biasing the meshing member is reduced when a centrifugal force is applied.

17. The one-way clutch according to claim 16, wherein the biasing member is a spring of elliptic shape, and its direction of long diameter coincides with an axial direction of the one-way clutch.

18. The one-way clutch according to claim 17, wherein the holder has a spring end positioning surface for preventing the spring from moving in an axial direction of the spring and a spring inner side positioning surface for preventing the spring from moving inward which is perpendicular to a spring axis, and the outer ring has a spring outer side positioning surface for preventing the spring from moving outward which is perpendicular to the spring axis so that the spring axis is perpendicular to a roller axis.

19. A pulley unit having a one-way clutch according to claim 16.

20. A one-way clutch comprising an inner ring, an outer ring, a meshing member disposed between both rings, and a biasing member for biasing the meshing member in a meshing direction, the biasing member being elastically deformable along an axis, wherein all radial lines that extend from an axis of the clutch through the biasing member are not perpendicular to the axis of the biasing member, when a centrifugal force is applied, the biasing member is deformed in a direction reducing the biasing force with respect to the meshing member so that when the rotation speed of the outer ring becomes equal to or greater than a predetermined speed, the meshing member moves in the meshing-releasing direction to a free condition and when the rotation speed of the outer ring becomes smaller than the predetermined speed, the meshing member moves in the meshing direction to a lock condition and a biasing force of the biasing member has enough magnitude to allow these meshing member movements.

21. A pulley unit having a one-way clutch according to claim 20.

* * * * *